(12) United States Patent
Capps

(10) Patent No.: US 8,115,866 B2
(45) Date of Patent: Feb. 14, 2012

(54) METHOD FOR DETECTING FILM PULLDOWN CADENCES

(75) Inventor: Marshall Charles Capps, Farmers Branch, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1371 days.

(21) Appl. No.: 11/618,698

(22) Filed: Dec. 29, 2006

(65) Prior Publication Data

US 2008/0158414 A1 Jul. 3, 2008

(51) Int. Cl.
*H04N 11/20* (2006.01)
*H04N 9/64* (2006.01)
*H04N 5/14* (2006.01)

(52) U.S. Cl. .......................... 348/452; 348/700; 348/448

(58) Field of Classification Search .................. 348/700, 348/701, 441, 97, 448, 452
See application file for complete search history.

(56) References Cited

U.S. PATENT DOCUMENTS

| | | | |
|---|---|---|---|
| 4,751,581 A * | 6/1988 | Ishiguro et al. | 348/734 |
| 4,982,280 A * | 1/1991 | Lyon et al. | 348/448 |
| 5,233,421 A * | 8/1993 | Chrisopher | 348/571 |
| 5,519,451 A | 5/1996 | Clatanoff | |
| 5,550,592 A | 8/1996 | Markandey | |
| 6,108,041 A * | 8/2000 | Faroudja et al. | 348/446 |
| 6,452,972 B1 | 9/2002 | Ohara | |
| 6,700,622 B2 * | 3/2004 | Adams et al. | 348/448 |
| 6,799,168 B1 * | 9/2004 | He et al. | 706/8 |
| 7,075,581 B1 * | 7/2006 | Ozgen et al. | 348/448 |
| 7,154,556 B1 * | 12/2006 | Wang et al. | 348/452 |
| 7,519,266 B1 * | 4/2009 | Willis et al. | 386/343 |
| 2004/0207751 A1 * | 10/2004 | White et al. | 348/441 |
| 2004/0208384 A1 * | 10/2004 | Lin et al. | 382/254 |
| 2004/0233327 A1 * | 11/2004 | Yeh et al. | 348/452 |
| 2004/0233328 A1 * | 11/2004 | Tsao et al. | 348/452 |
| 2005/0168632 A1 * | 8/2005 | Neuman et al. | 348/448 |
| 2007/0002169 A1 * | 1/2007 | Munsil et al. | 348/446 |

* cited by examiner

*Primary Examiner* — Victor Kostak
(74) *Attorney, Agent, or Firm* — Warren L. Franz; Wade J. Brady, III; Frederick J. Telecky, Jr.

(57) ABSTRACT

Given an incoming stream of interlaced video, data for each field is analyzed to detect a progressive frame cadence. If a progressive frame cadence is detected, a set of instructions is generated to instruct a de-interlacing unit which fields were mastered from the same progressive frame. The similarity in motion between two consecutive fields and the correlation between two consecutive fields is used to detect the presence of cadences and breaks in cadences. Breaks in cadences are continuously detected in order to characterize the source as video and prevent false detection of cadences.

23 Claims, 7 Drawing Sheets

METHOD FOR DETECTING FILM PULLDOWN CADENCES

TECHNICAL FIELD

The technical field of the examples to be disclosed in the following sections relates generally to the art of video processing, and more particularly, to the art of converting interlaced video signals into progressive video signals.

BACKGROUND

Current interlaced video streams may carry video signals mastered from progressive frames. For example, 24 Hz progressive film may be converted to PAL (Phase Alternating Lines) interlaced video by creating two fields from each progressive frame. This is referred to as a 2:2 cadence. Similarly, 24 Hz progressive film may be converted to NTSC (National Television System Committee) interlaced video by creating alternately three fields and two fields from the progressive frame. This is referred to as a 3:2 cadence. Other cadences include 5:5 or 4:4 for 12 Hz animation and 3:2:2 for sped up film. These video streams are later referred to as film-based sources. In contrast, video cameras typically capture each field at a separate moment in time. In this case, the video stream is not mastered from progressive frames and no consistent cadence is present. This is later referred to as video-based sources. Sporting events or other live television broadcasts typically are video-based sources.

Displaying such video streams on progressive video systems involves de-interlacing techniques. A device designated for performing a de-interlacing technique is often referred to as a de-interlacer or de-interlacing unit. De-interlacing is a process of converting interlaced fields into progressive video frames by doubling the number of lines. For example, current de-interlacers may use field jam, line interpolation, or a combination of the two methods to create the new lines. Field jam combines two consecutive fields (an even field and an odd field), doubling the vertical resolution. Field jam may introduce artifacts when there is motion between the two fields, so it is often used for areas with little motion. Line interpolation interpolates the new lines from a single field and is often used for areas with motion between fields. De-interlacers may exclusively use field jam for video mastered from progressive frames to reconstruct the original source. This is referred to as film pulldown, or sometimes 3:2 or 2:2 pulldown.

As incoming video streams may or may not carry video mastered from progressive frames, accurate detection of cadences becomes important to instruct the de-interlacer so that it may optimally de-interlace film-based sources without introducing artifacts in video-based sources. For example, misdetection of a video-based source as a film-based source or misdetection of the position in the cadence may cause combing artifacts and/or reduced frame rate.

SUMMARY

In an example, a method for used in a progressive video system having a de-interlacing unit designated for de-interlacing a stream video fields is disclosed herein. The method comprises: extracting a set of parameters from the video fields; generating a set of instructions based on the extracted parameters and an operation state of the de-interlacing unit, wherein the set of instructions comprises: a field jam direction identifying a field to which one of the video field in the stream combines; and delivering the set of instructions to the de-interlacing unit to instruct the de-interlacing unit.

In another example, a method for used in a progressive video system having a de-interlacing unit designated for de-interlacing a stream video fields is disclosed. The method comprises: detecting a break in the video fields; and causing the de-interlacing unit not to perform a de-interlacing operation when the break is detected.

In yet another example, a device for use in a progressive video system that comprises de-interlacing unit designated for de-interlacing a stream of interlaced signals for processing the stream of incoming video fields is disclosed herein. The device comprising a de-interlacing control unit that comprises: a characterization unit capable of generating a set of parameters and defining a set of field regions based on the incoming fields; a synchronization and lock state machine connected to the de-interlacing unit and the characterization unit for generating a set of instructions for instructing an operation of the de-interlacing unit based on the field region and the incoming fields; a cadence state machine connected to the synchronization and lock state machine for generating a field jam direction for the de-interlacing unit based on an instruction from the synchronization and lock state machine.

In yet another example, a method for used in a progressive video system having a de-interlacing unit designated for de-interlacing a stream video fields is disclosed herein. The method comprises: detecting a plurality of breaks in the video fields; determining whether the plurality of breaks complies with a pre-determined pattern; and instructing the de-interlacing unit to perform a de-interlacing when the consecutive cadence counter is greater than the threshold.

DETAILED DESCRIPTION OF EXAMPLES OF THE INVENTION

Figure 1:
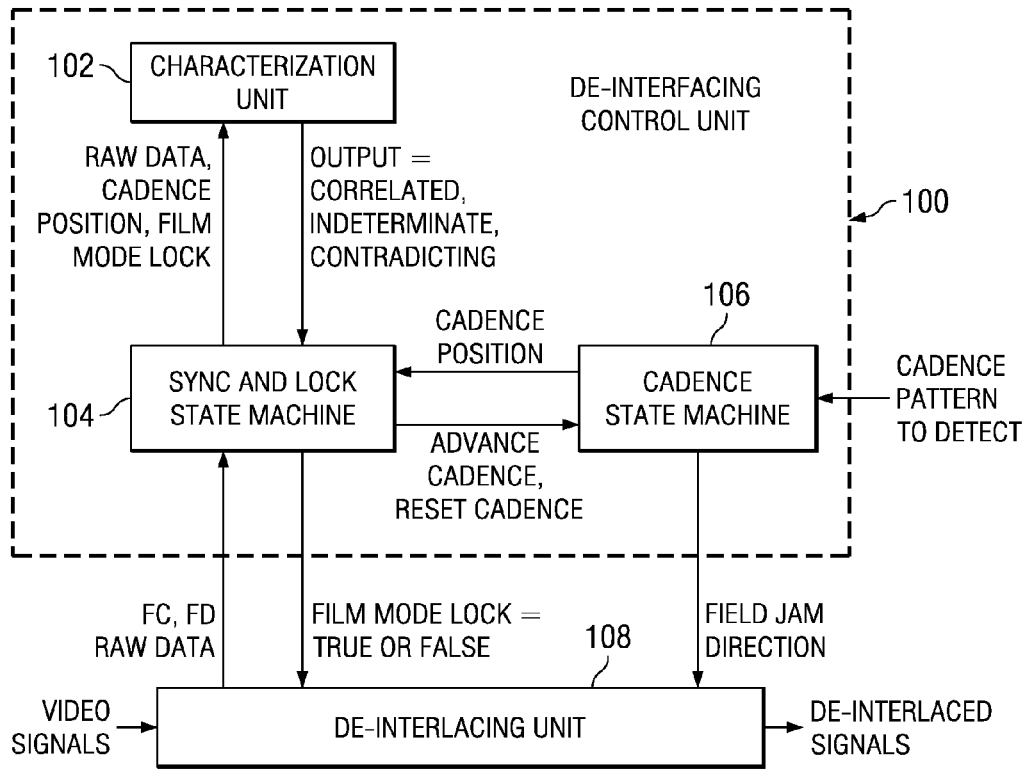
FIG. 1 illustrates a diagram showing an exemplary algorithm for detecting video streams.

Referring to the drawings, FIG. 1 illustrates a diagram of an exemplary detection algorithm. In this example, the algorithm uses de-interlacing control unit 100 that comprises synchronization and lock state machine 104, cadence state machine 106, and characterization unit 102. The de-interlacing control unit is connected to de-interlacing unit 108 that is capable of converting interlaced video fields into progressive video frames using, for example, standard de-interlacing methods, such as field jam and line interpolation and a combination thereof.

For each incoming video field, the de-interlacing control unit sends a set of instructions to de-interlacing unit 108 based on properties of the incoming video field. The instructions may comprise a film-mode-lock parameter having a TRUE or a FALSE value and a field-jam-direction parameter. The film-mode-lock parameter set to TRUE instructs the de-interlacer to perform a de-interlacing operation specific to film pulldown for the incoming video field. For example, assuming the de-interlacing control unit is set to detect 3:2 NTSC video cadences, the de-interlacing control unit 100 detects the incoming video field and determines whether the incoming video field is part of a 3:2 NTSC cadence. If so, the film-mode-lock parameter is set to TRUE. Otherwise, the film-mode-lock parameter is set to FALSE. The film-mode-lock parameter set to FALSE indicates that the incoming video field does not match the specified cadence; and the incoming video field was not mastered from a progressive frame. The de-interlacing unit should not perform the de-interlacing operation specific to film pulldown for the incoming video field when film-mode-lock is set to FALSE.

In addition to the film-mode-lock parameter, the de-interlacing control unit 100 also generates and sends to the de-interlacing unit 108 a field-jam-direction parameter. When the film-mode-lock parameter is TRUE, the field-jam-direction parameter indicates which field, either the previous field or the next field, can be combined with the current field so as to reconstruct the original progressive frame. It is noted that the de-interlacing control unit can be set to detect any arbitrary progressive frame cadence in interlaced video signals. For example, the de-interlacing control unit can be used to detect 3:2 cadences, 2:2 cadences, 5:5 cadences, 3:2:2 cadences, 4:4 cadences, and other types of cadences resulting from the conversion from progressive frames to NTSC or PAL standards.

Figure 2:
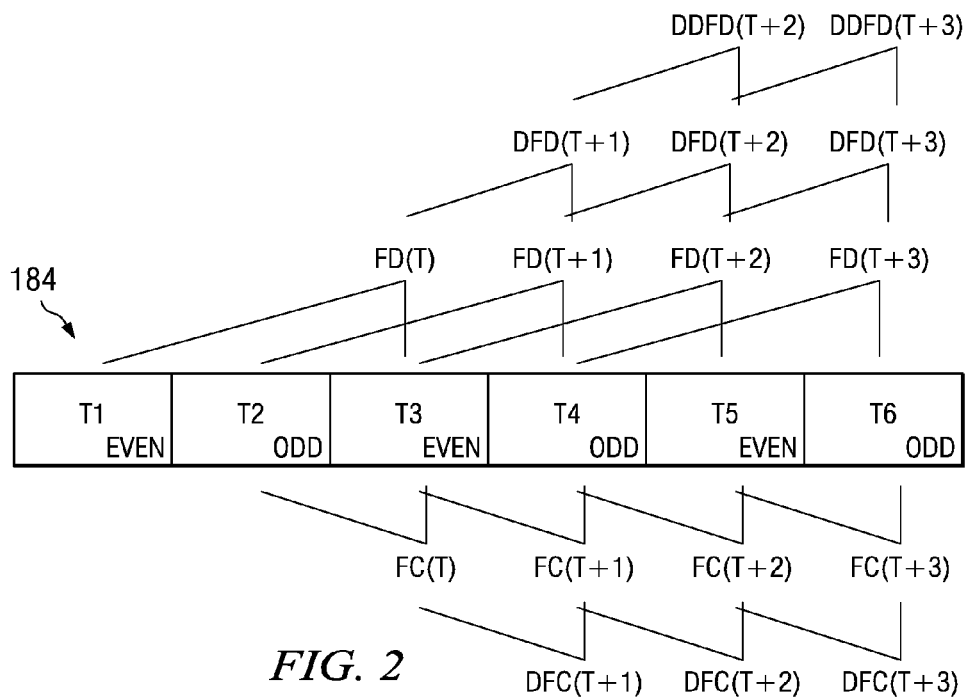
FIG. 2 illustrates notations of parameters that are used for the algorithm.

The de-interlacing control unit generates the film-mode-lock and the field-jam-direction parameters based on a set of parameters extracted from the incoming video fields and a set of criteria, as shown in FIG. 2. Referring to FIG. 2, a sequence of interlaced video fields 184 is received. For demonstration convenience, assume the alternating even and odd video fields are sequentially received at times T1, T2, T3, T4, T5, and T6, which may or may not be consecutive. Field difference FD is defined as the difference between every other interlaced field. For example, FD (T) is equal to F(T3)−F(T1), wherein F(T3) is the interlaced field at location T3; and F(T1) is the interlaced field at location T1. The difference can be calculated from sampled portions in the interlaced fields F(T3) and F(T1), such as a picture in the same location of a frame or a screen. Alternatively, the difference can be calculated from the field data of the interlaced fields F(T3) and F(T1). Following the same calculation process, field differences FD (T+1), FD (T+2), FD (T+3) and other field differences can be calculated for all interlaced fields.

From field differences, delta field differences DFD defined as the absolute differences between adjacent field differences FD can be obtained. For example, DFD(T+1) can be calculated as the absolute value of FD(T+1) and FD(T), and delta field differences for the above field differences can be expressed as:

$$DFD(T+1)=abs[FD(T+1)-FD(T)],$$

$$DFD(T+2)=abs[FD(T+2)-FD(T+1)], \text{ and}$$

$$DFD(T+3)=abs[FD(T+3)-FD(T+2)],$$

wherein abs stands for the absolute value operation.

From delta field differences, delta delta field differences DDFD defined as the differences between adjacent delta field differences DFD can be obtained. For example, DDFD(T+2) can be calculated as the absolute value of DFD(T+2) and DFD(T+1), which can be expressed as:

$$DDFD(T+2)=DFD(T+2)-DFD(T+1).$$

Another set of parameters, field correlation FC and delta field correlation DFC, are calculated from the adjacent interlaced fields. Field correlation FC is defined as the difference between adjacent interlaced fields. For example, FC(T) can be expressed as:

$$FC(T)=[F(T3)-F(T2)].$$

Correlations can be calculated for other interlaced fields:

$$FC(T+1)=[F(T4)-F(T3)],$$

$$FC(T+2)=[F(T5)-F(T4)], \text{ and}$$

$$FC(T+3)=[F(T6)-F(T5)].$$

Delta field correlation DFC can be calculated from the above calculated field correlations. For example:

$$DFC(T+1)=FC(T+1)-FC(T),$$

$$DFC(T+2)=FC(T+2)-FC(T+1), \text{ and}$$

$$DFC(T+3)=FC(T+3)-FC(T+2).$$

Figures 3A, 3B, 4:
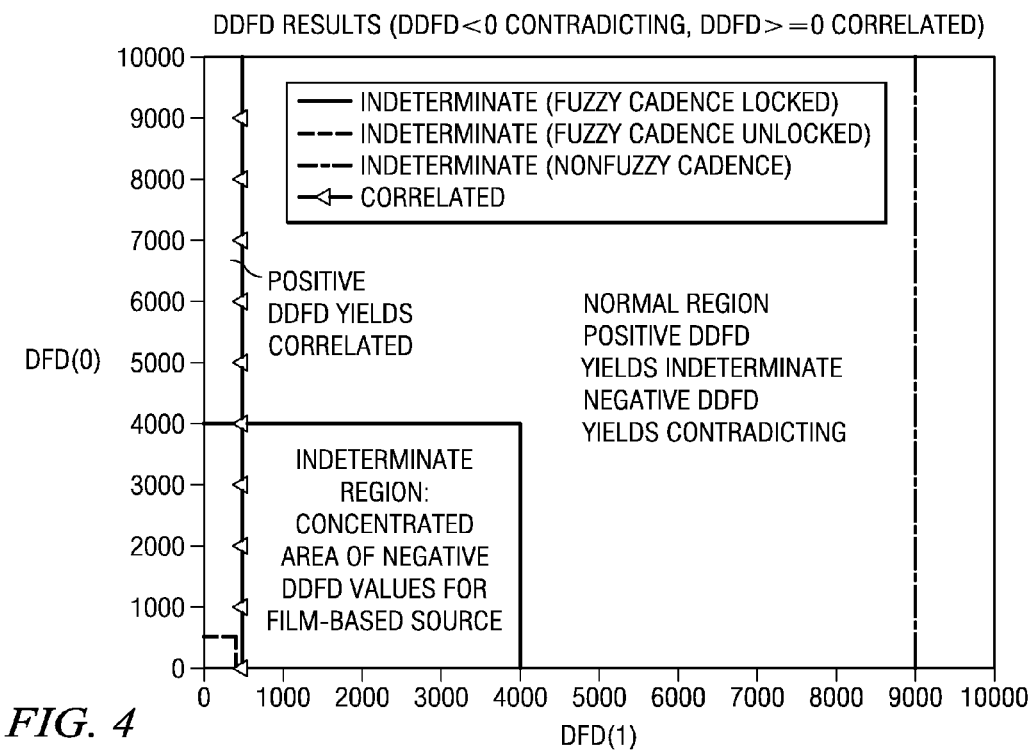
FIG. 3a illustrates a truth value table of the parameters in FIG. 2 for a cadence of ideal 3:2 pulldown fields.
FIG. 3b illustrates a truth value table of the parameters in FIG. 2 for a cadence of ideal 2:2 pulldown fields.
FIG. 4 to FIG. 8 present diagrams showing the data thresholds used to characterize a given field's data as correlated, indeterminate, or contradicting to the cadence.

Exemplary values of the above parameters for an ideal film cadence are presented in FIG. 3a and FIG. 3b. Referring to FIG. 3a, parametric values for an ideal 3:2 pulldown cadence are listed therein. "0", "1", and "2" refer to the field index relative to the original progressive frame. "H" represents a large value, such as a value equal to or larger than a pre-determined high threshold. A large value FD indicates a high speed motion or significant change in the frame. A large value FC indicates a low correlation between interlaced fields; and a large value DFD indicates dissimilar amounts of motion between two sets of fields. "L" represents a small value, such as a value equal to or lower than a pre-determined low threshold. A small value FD indicates a low speed motion or small change in fields. A small value FC indicates a high correlation between interlaced fields; and a small value DFD indicates similar amounts of movements between fields. "+" and "−" represent the sign of the value, where the magnitude of the value is ignored for the ideal cadence. "\" indicates an irrelevant data to the determination.

As can be seen in FIG. 3a, field differences FD calculated from odd and even fields derived from frame T have large values. The FD calculated from the first two fields of frame T+1 have large values; while the FD calculated for the third field is substantially 0 because the third field repeats the first field in frame T+1. FC has large values for the first field in each frame as there should be little correlation between the first field of a frame and the last field of the previous frame, and low values in other fields. DFD has a large value for the first field in each frame and a low value in the second field in each frame. Still because the third repeating field of frame T+1 is identical to the first field of frame T+1, the DFD calculated for the third field of frame T+1 is irrelevant in making the determination. As the sign of a DFC value is the primary concern, only signs of the DFC values are listed therein. For the ideal cadence, DFC has a positive sign for the first field in each frame and a negative sign for the second field in each frame. The repeating third field of frame T+1 results in 0 for DFC. For the cadence having repeating fields, such as fields 0 and 2 in frame T+1, the DDFD calculated for the following field, such as field 0 in frame T, is ignored as being irrelevant to the determination. The DDFD calculated for the second field in each frame yields a negative sign; while the DDFD calculated for the repeating field (the third field) yields a positive sign, as shown in FIG. 3a.

FIG. 3b lists parametric values for an ideal 2:2 pulldown cadence. Because the 2:2 pulldown cadence divides each frame into even and odd fields without repeating any fields, field difference values FD are high for all fields. For the same reason, field correlation FC values, as well as delta field difference DFD values, are high for the first field (i.e. the even fields) and are low for the second fields (i.e. the odd fields) of each frame. The first fields of the frames result in positive values for delta delta field difference DDFD and delta field correlation DFC; while the second fields of the frames result in negative values of delta delta field difference DDFD and delta field correlation DFC, as shown in FIG. 3b.

However, video signals often exhibit characteristics that are non-ideal for detecting progressive frame cadences. For example, low motion scenes and smooth pans in films do not yield the alternating sign pattern in DFC and DDFD described in the ideal cadence. These scenes may even yield an alternating sign pattern in DFC and DDFD that is inverted from the ideal cadence. This is undesirable as it can lead to the detection of the cadence with the incorrect cadence position, which can create severe artifacts when the wrong fields are combined together. More problematic, video signals that do not originate from progressive frames (e.g. captured from a video camera at 60 Hz or 50 Hz) frequently yield an alternating sign pattern in DFC and DDFD. This is undesirable as it can lead to the false detection of a cadence and cause severe artifacts when fields are incorrectly combined. This problem can be solved by applying a set of pre-determined detection rules using parametric values (and/or signs) as described above.

The above parameters can be used to define a set of regions that characterize a given field's data as correlated or contradicting to the desired cadence. The above parameters can also be used to define a set of regions to characterize the data as indeterminate. For example, field data from the low motion scenes or smooth pans mentioned above would be characterized as indeterminate and not used in the detection of the cadence. The data for each incoming field is calculated based on the expected field position in the desired cadence. If the data for a field falls into a correlated region, the data matches the expected data for the position in the desired cadence. If the data for a field falls into a contradicting region, the data does not match the expected data for the position in the desired cadence. If the data for a field falls into an indeterminate region, the data is not strong enough to judge against the expected data for a position in the desired cadence. The above regions can be defined as follows based on the parameters.

In the following discussion, the parenthetical index, such as (0) and (1) refers to the field index relative to the expected progressive frame. DDFD as used below is sign corrected based on the field index such that it is always positive in the ideal cadence. A positive sign indicates the expected sign for a given field index. For the incoming field, an indeterminate region can be defined such as if DFD (0) is less than a threshold such as $FC(1)/370+700$; and if DFD(1) is less than a threshold such as 4000; and if DFD(0) is less than a threshold such as 4000. The thresholds used can be calculated differently based on the state of the film-mode-lock parameter and the type of cadence. For example, if film-mode-lock is set to TRUE, the thresholds may be calculated at larger values to help maintain the film-mode-lock state more aggressively. If the cadence contains at least one repeated field (e.g. 3:2), referred to as a non-fuzzy cadence, the thresholds may also be calculated at larger values such that the repeated field's data is primarily used for detecting cadences. The incoming field is in a correlated region if it is determined that the data does not result in the indeterminate region; and if DDFD is greater than zero; and if DFD (1) is less than a threshold, such as 500; and if FC(1) is less than a threshold, such as 500000, or if DFD(0) is greater than a threshold such as $FC(1)/17+10000$. The incoming field is in a contradicting region if the data does not result in the indeterminate region; and if (DDFD is less than zero or if DFD(1) is greater than 2500). It is noted that the above thresholds are examples for demonstration. Other suitable values are also applicable. Moreover, the above thresholds can be dynamically adjustable during the operation.

In addition to DDFD values, the data regions can also be defined based upon delta field correlation DFC values. For the incoming field, an indeterminate region can be defined such as if FD is less than a threshold, such as $200000-200\times10^9/(FC(1)+1400000)$; and if the absolute value of DFC is less than $FC(1)\times4/5-10000$. The thresholds used can be calculated differently based on the state of the film-mode-lock parameter and the type of cadence. For example, if film-mode-lock is set to TRUE, the thresholds may be calculated at larger values to help maintain the film-mode-lock state more aggressively. If the cadence is non-fuzzy, the thresholds may also be calculated at larger values such that the repeated field's data is primarily used for detecting cadences. The incoming field is in a correlated region if it is determined that the data does not result in an indeterminate region; and if DFC is greater than zero; and if FC (1) is less than a threshold, such as 450000. The incoming field is in a contradicting region if FD is greater than a threshold, such as $215000-200\times10^9/(abs(DFC+1700000)$ or if the data does not result in an indeterminate region. It is noted that the above thresholds are examples for demonstration. Other suitable values are also applicable. Moreover, the above thresholds can be dynamically adjustable during the operation.

Figure 5:
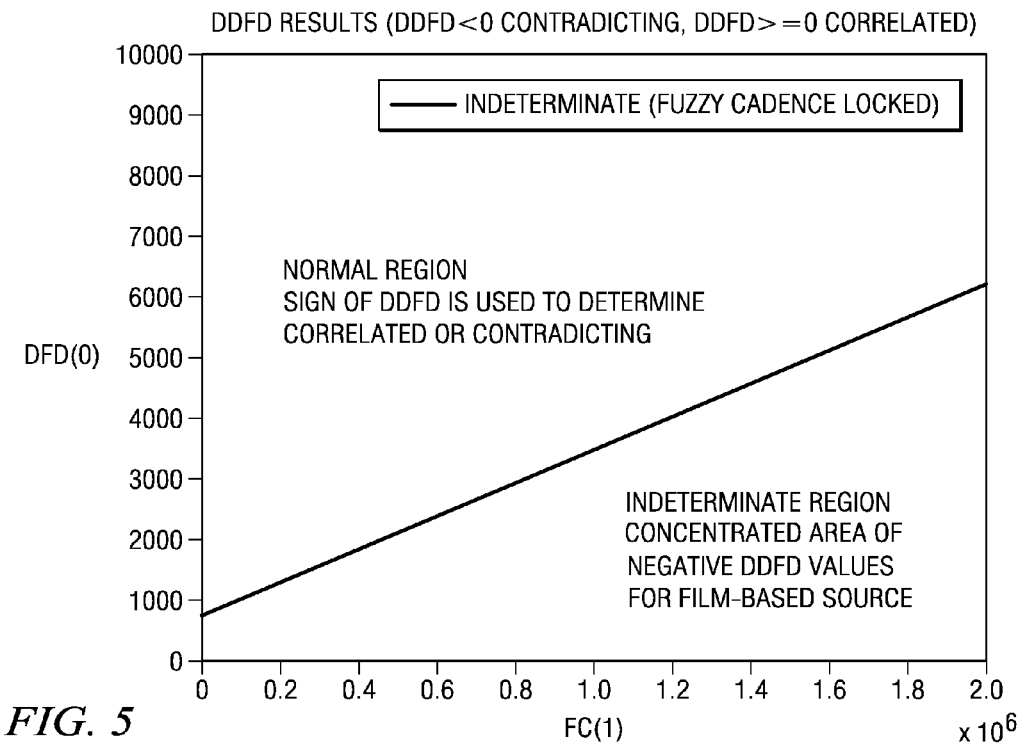
Figure 6:
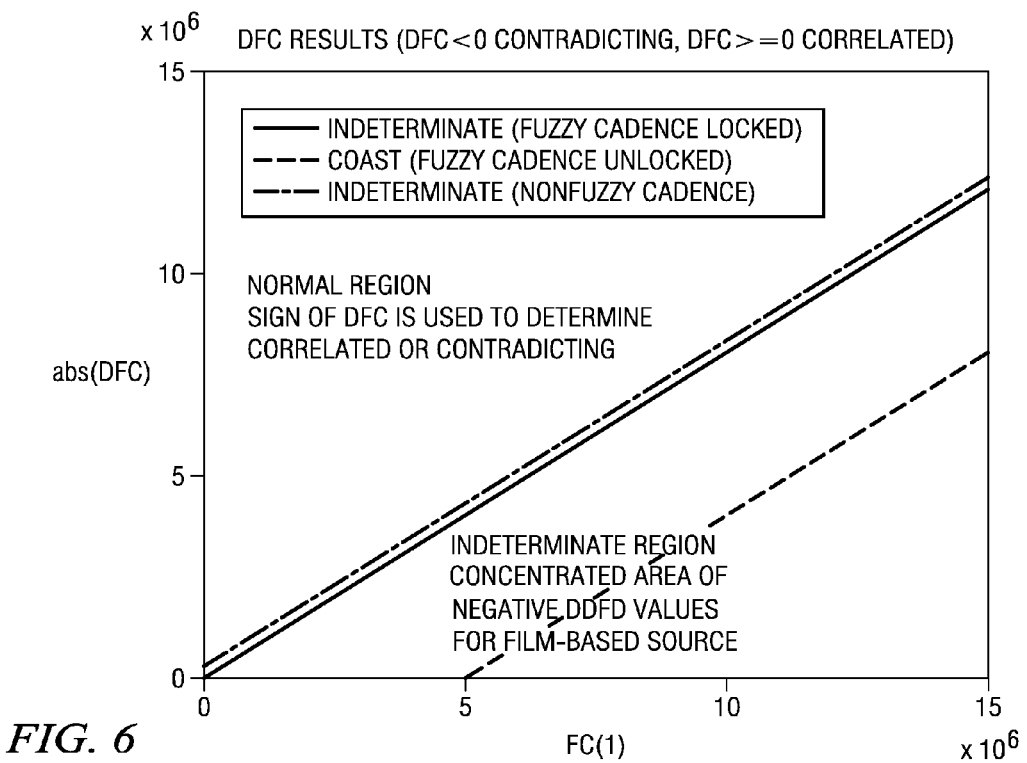
Figure 7:
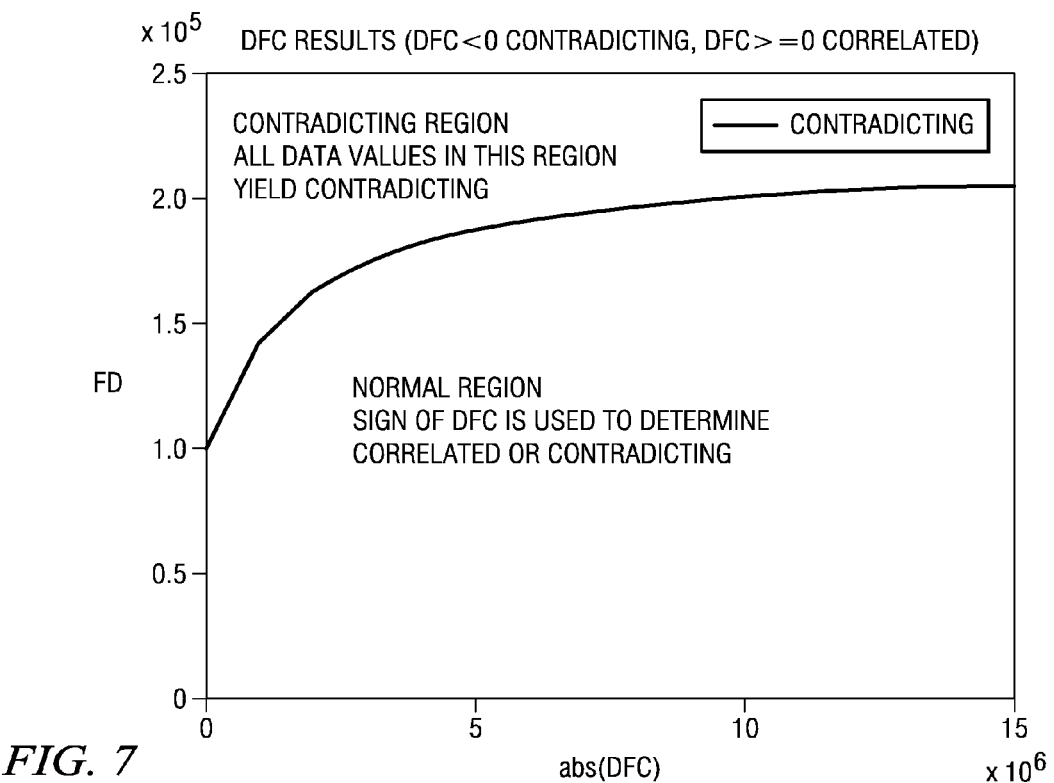
Figure 8:
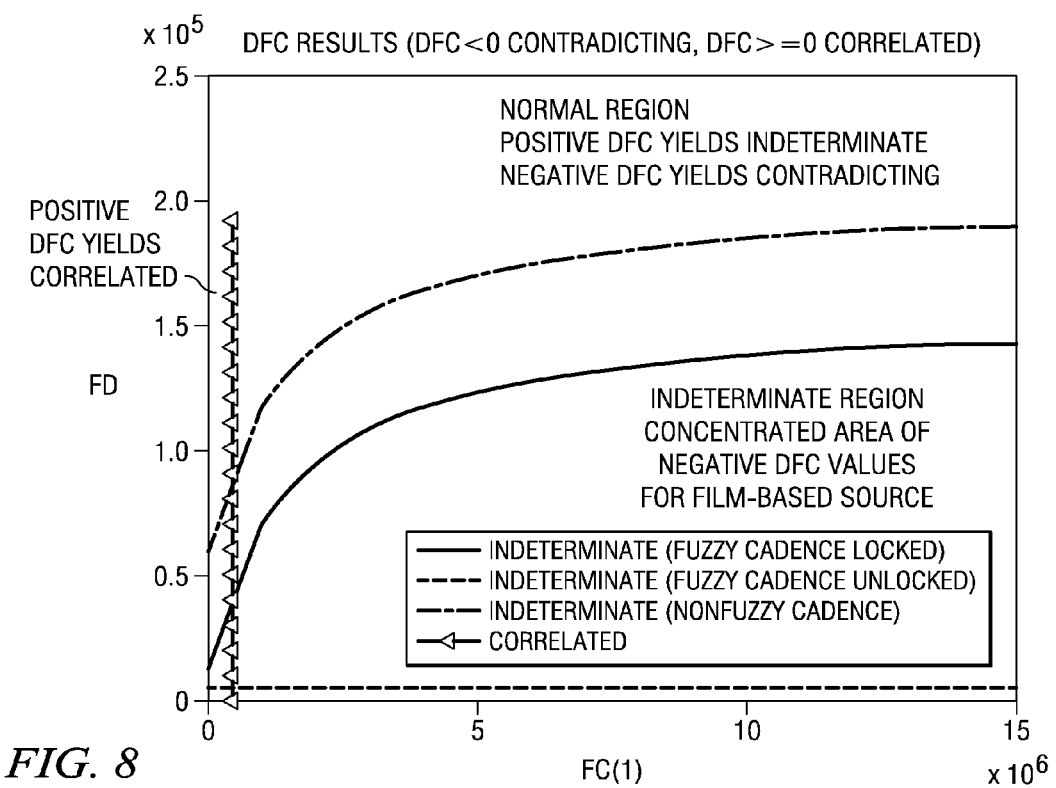

The above regions including correlated, indeterminate, and contradicting regions are illustrated in diagrams shown in FIGS. 4 through 8. Specifically, the diagram in FIG. 4 shows the indeterminate regions for fuzzy cadences when the film-mode-lock parameter is locked or unlocked, non-fuzzy cadences, correlated regions, and contradicting regions based on DFD(1) and DFD(0). The diagram in FIG. 5 shows the indeterminate regions for fuzzy cadences when the film-mode-lock parameter is locked or unlocked, non-fuzzy cadences, correlated regions, and contradicting regions based on DFD(0) and FC(1). The diagram in FIG. 6 shows the indeterminate regions for fuzzy cadences when the film-mode-lock parameter is locked or unlocked, non-fuzzy cadences, correlated regions, and contradicting regions based on abs (DFC) and FC(1). The diagram in FIG. 7 shows the indeterminate regions for fuzzy cadences when the film-mode-lock parameter is locked or unlocked, non-fuzzy cadences, correlated regions, and contradicting regions based on abs(DFC) and FD. The diagram in FIG. 8 shows the indeterminate regions for fuzzy cadences when the film-mode-lock parameter is locked or unlocked, non-fuzzy cadences, correlated regions, and contradicting regions based on FC(1) and FD.

The above parameters are calculated by characterization unit 102 in FIG. 1, which can be a software calculation module implemented as a set of computer-readable instructions in a computing device. Alternatively, the above calculations can be implemented in a designated electronic circuit or hardware, such as a field programmable gate array (FPGA) or an application specific integrated circuit (ASIC). With the above calculated parameters, a parameter with the value of correlated, indeterminate, or contradicting is derived based on the calculated parameters and is output from the characterization unit 102 to the sync and lock state machine 104 as shown in FIG. 1. A block diagram showing an exemplary operation of the characterization unit 102 is illustrated in FIG. 9.

Figure 9:
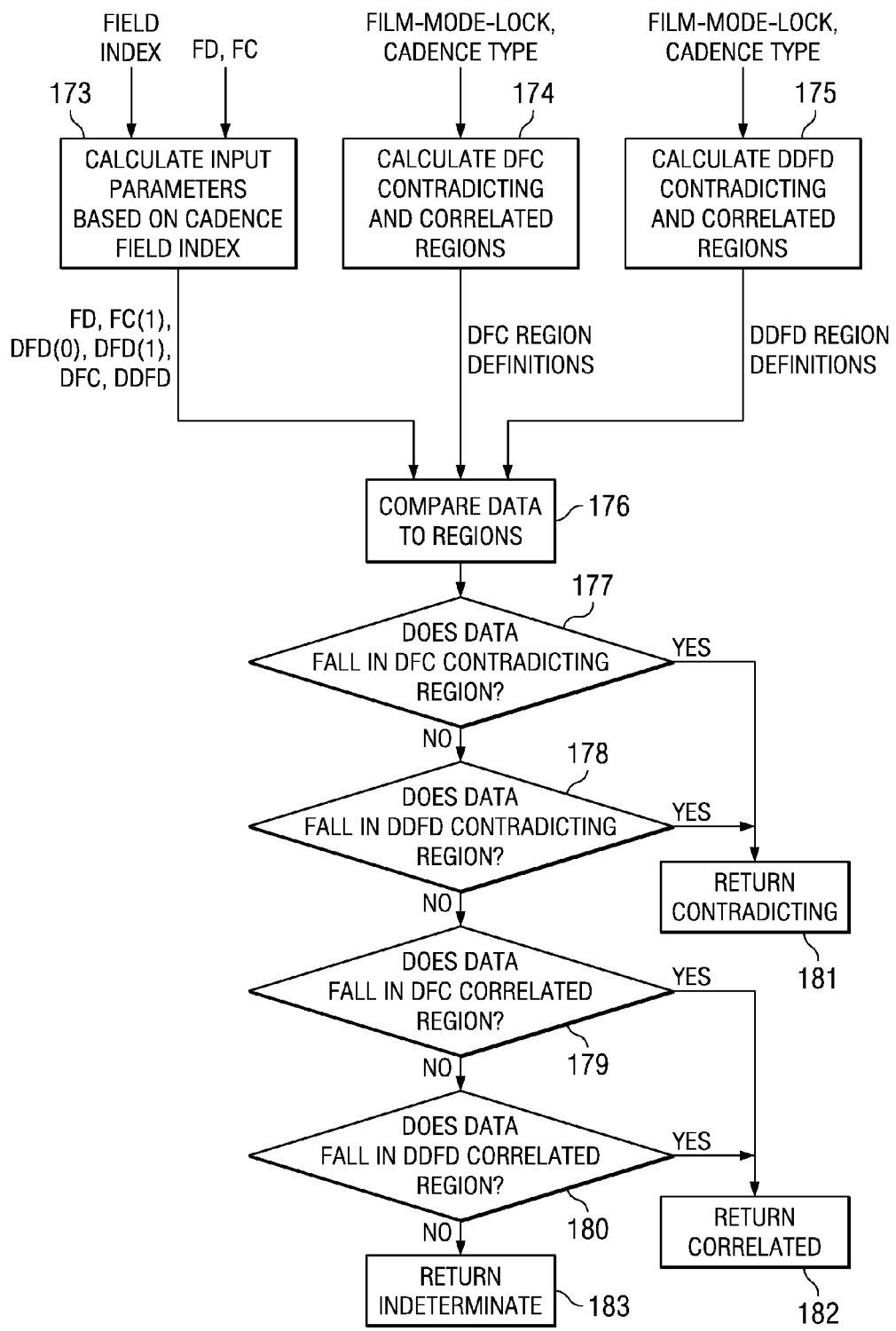
FIG. 9 is a diagram showing an exemplary operation of a characterization unit used in the algorithm in FIG. 1.

Referring to FIG. 9, the incoming field data (raw data) is delivered from the sync and lock state machine. The set of parameters is extracted from the received raw field data based on the expected cadence field index delivered from the sync and lock state machine as described above. Specifically, input parameters, such as FD, FC(1), DFD(0), DFD(1), DFC, and DDFD are calculated based on received FC, FD, and field index (step 173). Step 174 calculates DFC contradicting and correlated regions based on the received film-mode-lock parameter and desired cadence type; and Step 175 calculates DDFD contradicting and correlated regions based on the received film-mode-lock parameter and desired cadence type. The calculated input parameters (i.e. FD, FC(1), DFD(0), DFD(1), DFC, and DDFD) are then compared to DFC regions and DDFD regions (step 176), as described above. If the field's data (parameters) falls into either the DFC (step 177) or DDFD (step 178) contradicting region, the return parameter is set to contradicting (step 181). If the field's data falls into either the DFC (step 179) or DDFD (step 180) correlated regions and does not fall into the contradicting regions, the return parameter is set to correlated (step 182). If the field's data does not fall into the contradicting regions or correlated regions, the return parameter is set to indeterminate (step 183).

The information of the incoming field in a specific field data region (indeterminate, contradicting, or correlated) is delivered to the sync and lock state machine (104 in FIG. 1), for example, through outputs of blocks 181, 182, and 183 in FIG. 9. The sync and lock state machine then determines how to synchronize the cadence state machine to the incoming field as appropriate and sends instructions to the cadence state machine (106 in FIG. 1) and the de-interlacing unit (108 in FIG. 1). Specifically, the sync and lock state machine advances or resets the cadence state machine based on the result of the characterization unit for each field. The sync and lock state machine can employ multiple states to dynamically modify how the cadence state machine is controlled and how the film-mode-lock parameter is set. For example, when a stable cadence is detected, the cadence state machine should advance on all correlated and indeterminate fields and the film-mode-lock parameter should be set to TRUE. When a stable cadence is not detected or a contradicting field occurs, the film-mode-lock parameter should be set to FALSE. In this state, the cadence state machine can be allowed to advance on correlated and indeterminate fields as before in order to help detect the frequency of contradicting fields. Video-based sources exhibit many correlated fields using the data regions explained above, as the data often overlaps with the correlated regions used to detect film-based sources. However, video-based sources are marked by frequent contradicting fields—or 'breaks'—when compared against the expected cadence, whereas film-based sources tend to have few breaks. The sync and lock state machine can employ a hysteresis counter in operation to identify video-based sources. For every break detected in the UNLOCKED or SYNC DETECTED states, the hysteresis counter decrements and requires an extra completed cadence in the SYNC DETECTED state before the state machine can enter the LOCKED state. This ensures that video-based sources, which have more frequent breaks than completed cadences, will not enter the LOCKED state, whereas film-based sources, which have more frequent completed cadences than breaks in the cadences, can still enter the LOCKED state. The lower limit for the hysteresis counter is set at a threshold, such as −30, and determines the maximum amount of lag between switching from a video-based source to a film-based source. Application of the hysteresis counter can prevent occasional groups of falsely correlated video-based fields from causing a film mode lock, while still allowing for film-based sources to achieve film mode lock with fields that fall in the same correlated data region. A diagram illustrating an exemplary operation of the sync and lock state machine is illustrated in FIG. 10.

Figure 10:
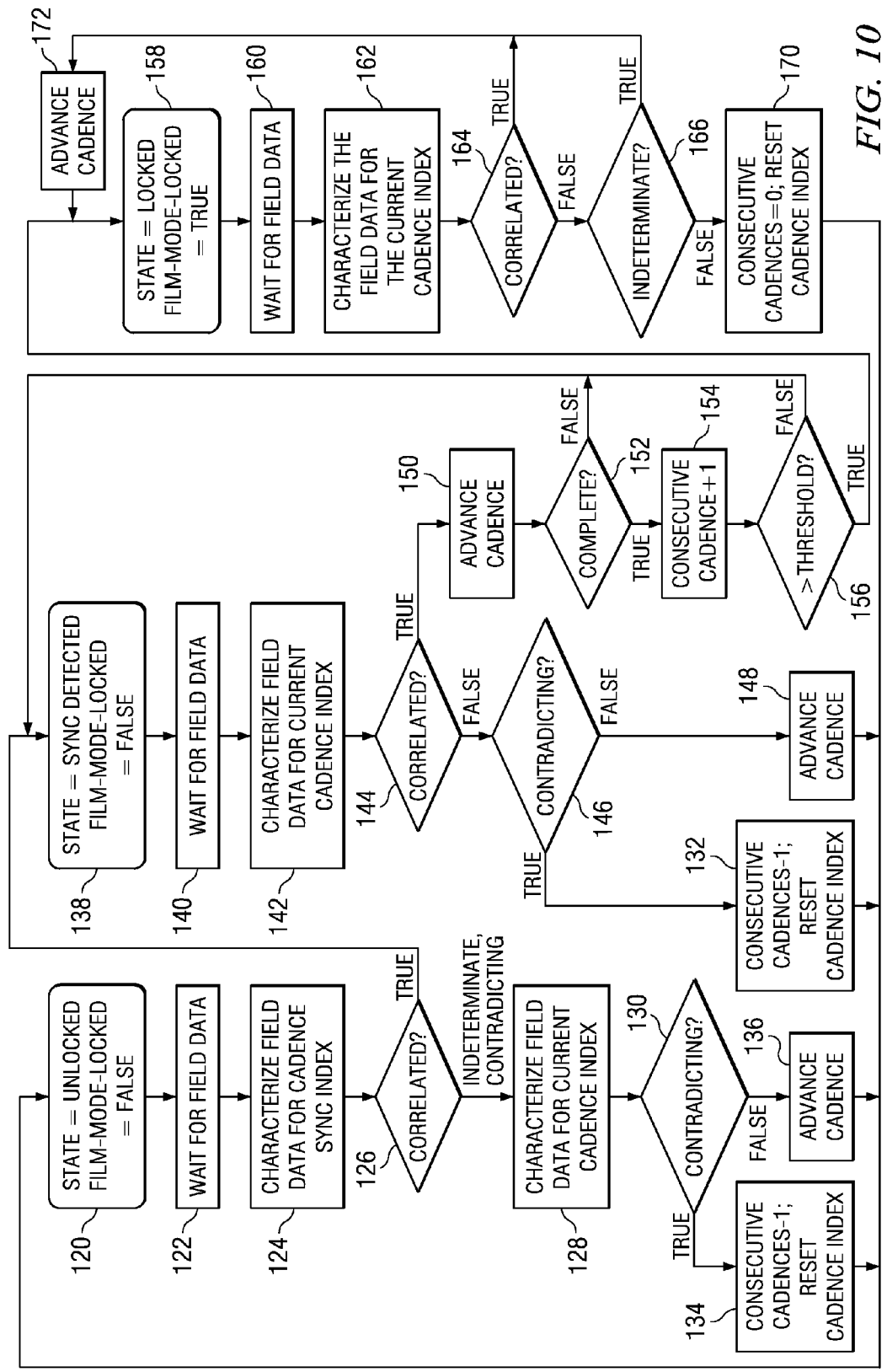
FIG. 10 is a diagram showing an exemplary operation of a synchronization and lock state machine used in the algorithm in FIG. 1.

Referring to FIG. 10, UNLOCKED represents a state where no stable cadence is detected and the cadence state machine field index is not expected to match the incoming video field. SYNC DETECTED represents a state wherein a synchronization field is detected and the cadence state machine field index is expected to align with the incoming video field. LOCKED in FIG. 10 represents the state wherein the specified cadence is detected as stable and the film-mode-lock parameter in FIG. 1 is set to TRUE. Starting from block 120 wherein the state equals UNLOCKED and the film-mode-lock parameter is set to FALSE, the process waits for an incoming field data (step 122). Upon receiving field data, the incoming video field data is first characterized with the sync cadence index (step 124) by the characterization unit (102 in FIG. 1 as discussed above). The sync cadence index can be any set field in the cadence. For example, the sync cadence index can be the first repeated field in a 3:2 cadence as it is the easiest to identify. If the characterization unit returns that the data falls in a correlated region (step 126), the cadence state machine is instructed to reset its state to the sync cadence index and advance one field, and the state is set to SYNC DETECTED (step 138). If the incoming video field data does not fall in a correlated region (after step 126), the incoming field data is characterized a second time, but with the current cadence index from the cadence state machine (step 128). If the incoming video field data falls in the contradicting region (step 130), the cadence state machine is instructed to reset to the sync cadence position and the consecutive cadence parameter decreases by 1 (step 134). Decrementing the consecutive cadences parameter in step 134 tracks breaks in the expected cadence to help identify video-based sources. If the results of step 130 are that the data is correlated or indeterminate (after step 130), the cadence state machine is instructed to advance (step 136) and the process flows back to step 120.

If step 126 determines that the incoming field data is correlated with the sync cadence position, the state is set to SYNC DETECTED (step 138). The state machine waits for the next field data (step 140) and characterizes it with the current cadence index from the cadence state machine (step 142). If the incoming field data falls in the correlated region (step 144), the cadence state machine is instructed to advance (step 150). If the cadence-complete parameter from the cadence state machine (FIG. 11) is TRUE (step 152), the consecutive cadences parameter is incremented (step 154). If the consecutive cadences parameter is greater than or equal to a positive threshold (step 156), such as 10, the state is set to LOCKED (step 158). If the consecutive cadences parameter is less than the threshold (step 156), the process flows back to step 138. If the incoming field data in step 146 falls in the contradicting region, the cadence state machine is instructed to reset, the consecutive cadences parameter decreases by 1 (step 132). The state is also set to UNLOCKED and the process flows back to step 120. If the incoming field data after step 146 determination falls in the indeterminate region, the cadence is advanced (step 148), and the state is set to UNLOCKED such that the process flows back to step 120.

If the state is set to LOCKED after step 158, film-mode-lock parameter is set to TRUE and the state machine waits for the next field data (step 160). The state machine characterizes the incoming field data with the current cadence index from the cadence state machine (step 162). If the field data falls into a correlated (step 164) or indeterminate (step 166) region, the cadence is advanced (step 172) and the process flows back to step 158. If the field data falls into a contradicting region (step 168), indicating a break in the cadence, the consecutive cadences parameter is reset to 0 and the cadence state machine is instructed to reset the cadence index (step 170). The state is set to UNLOCKED and the film-mode-lock parameter is immediately set to FALSE, and the process loops back to step 120.

As discussed earlier with reference to FIG. 1, the cadence state machine (106 in FIG. 1) is designed to maintain a state for film mode locked or unlocked; and to maintain a state for the expected position of the incoming field in a specific film cadence (e.g. 2:2 or 3:2 cadence) and synchronizes the specific cadence to the incoming fields. For this purpose, the cadence state machine determines which fields to combine (field jam) if locked to the film mode; determines how to characterize incoming field; and supports detection for any arbitrary cadence specified. Specifically, the cadence state machine (106) employs a state for each field in a specific cadence until the pattern repeats. Because the incoming video fields can be an arbitrary video cadence, the incoming field cadence can be specified, such as in a form of a data array with each element in the array containing the number of fields for the respective progressive frame. A value 0 terminates the array; and the value 1 is invalid. As an example a 3:2 pulldown video cadence can be represented by a data array as $\{3, 2, 0\}$; a 2:2 pulldown field cadence can be represented by a data array of $\{2, 0\}$. The cadence state machine analyzes the incoming field to determine the best field to which the incoming field synchronizes. Until the cadence is synchronized, the raw data from every field is compared against this index position. Also, the cadence index is set to this synchronization field when reset. The above operations of the cadence state machine can be illustrated in the diagram as shown in FIG. 11

Figure 11:
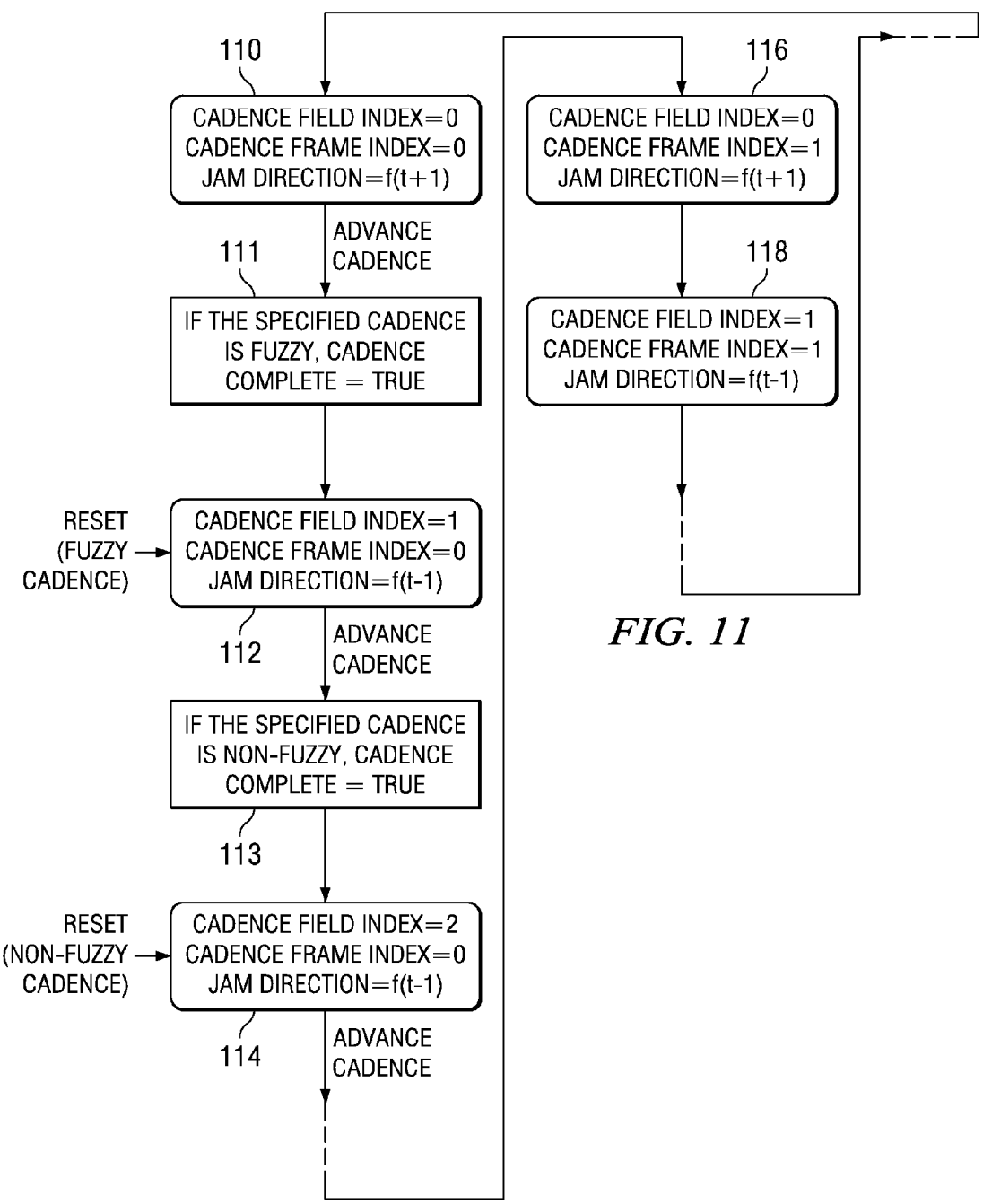
FIG. 11 is a diagram showing an exemplary operation of a cadence state machine used in the algorithm in FIG. 1.

Referring to FIG. 11, when the cadence state machine is instructed to reset by the sync and lock state machine and the specified cadence is fuzzy—or does not contain a repeated field—it will set the state to cadence field index=1 and cadence frame index=0 (step 112), referred to as the sync index. When the cadence state machine is instructed to reset by the sync and lock state machine and the specified cadence is non fuzzy, it will set the state to cadence field index=2 and set cadence frame index equal to the first frame containing a repeated field (step 114). When the cadence state machine is instructed to advance by the sync and lock state machine, it will increment the cadence field index by 1. If the field index is greater than the number of fields in the frame, the cadence frame index is incremented by 1 and the field index is set to 0 (step 116). The cadence advances by increasing the cadence field index by 1 (step 118). If the frame index is greater than the number of progressive frames in the cadence, the frame and field indexes are set to 0. If after advancing, the cadence field and frame indexes equal the sync index, the cadence complete flag is asserted (step 111 and 113) signaling that the cadence position was advanced through all the fields in the cadence without receiving a reset instruction from the sync and lock state machine.

For each state in the specified cadence, the jam direction is specified such that the appropriate frames can be combined when the film-mode-lock parameter is set to TRUE. For example, for a state where cadence field index=0, the current field should be combined with the next field to recreate the expected progressive frame. If the specified cadence is a longer cadence, such as a 3:2:2 cadence, the process continues after step 118 in a similar fashion. In general, if the cadence contains a total of p frames with N(x) fields in each frame before repeating, it can be expressed as: cadence frame index=x (x=0 to p−1); cadence field index=i (i=0 to N(x)−1); and jam direction=f(t+1) when i=0 and f(t−1) when i>0.

The examples of the detection algorithm as described above can be implemented in many ways. As an example, the detection method can be implemented in an electronic circuit, such as a field programmable gate array (FPGA) or an application specific integrated circuit (ASIC). In particular, the examples of the above described detection method can be implemented in de-interlacer hardware for DDP3020 ASICS; alternatively, they can be implemented as a set of computer-executable instructions, which can be stored in a computer-readable medium.

It will be appreciated by those of skill in the art that a new and useful improved method for detecting film pulldown cadences have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method for use in a progressive video system having a de-interlacing unit designated for de-interlacing a stream of video fields, the method comprising:
   extracting a set of parameters from the video fields;
   generating a set of instructions based on the extracted parameters and an operation state of the de-interlacing unit, wherein the set of instructions comprises:
      a field jam direction parameter identifying a field to which one of the video field in the stream combines;
      a LOCK instruction that causes the de-interlacing unit to perform a de-interlacing operation to said one of the stream of video fields; and
      an UNLOCK instruction that causes the de-interlacing unit not to perform a de-interlacing operation to said one of the stream of video fields; and
   delivering the set of instructions to the de-interlacing unit to instruct the de-interlacing unit.

2. The method of claim 1, wherein the step of generating a set of instructions further comprises:
   defining a set of data regions, comprising correlated, contradicting, and indeterminate data regions for a specific cadence; and
   generating the set of instructions by comparing the set of parameters derived from said one of the stream of video fields with the defined data regions.

3. The method of claim 2, wherein the step of delivering the set of instructions further comprises:
   generating the LOCK instruction if said video field falls in the correlated data region; and
   generating the UNLOCK instruction if said video field falls in the contradicting data region.

4. The method of claim 3, wherein the step of delivering the set of instructions further comprises generating the UNLOCK instruction if said video field falls in the indeterminate data region.

5. The method of claim 3, wherein the step of delivering the set of instructions further comprises generating the UNLOCK instruction if said video field is a video-based source.

6. The method of claim 3, wherein the step of generating the LOCK instruction further comprises:
   setting a state to UNLOCKED and a film-mode-lock parameter as FALSE;
   upon receiving a field, characterizing a field data of the received field data for a cadence sync index;
   if it is determined that the data of the received field falls in the correlated region, resetting the state as sync detected; and waiting for a next field;
   upon receiving the next field, characterizing the next field for a current cadence index;
   if it is determined that the a data of said next video field falls in the correlated region, advancing the cadence; and increasing a consecutive cadence by 1; and
   setting the state as LOCKED and the film-mode-lock parameter as TRUE so as to cause the de-interlacing unit to perform the de-interlacing.

7. A method for use in a progressive video system having a de-interlacing unit designated for de-interlacing a stream video fields, the method comprising:
   extracting a set of parameters from the video fields;
   generating a set of instructions based on the extracted parameters and an operation state of the de-interlacing unit, wherein the set of instructions comprises a field jam direction parameter identifying a field to which one of the video field in the stream combines;
   delivering the set of instructions to the de-interlacing unit to instruct the de-interlacing unit;
   detecting a break in the video fields; and
   causing the de-interlacing unit not to perform a de-interlacing operation when the break is detected.

8. The method of claim 7, wherein the set of instructions further comprises:
   a LOCK instruction that causes the de-interlacing unit to perform a de-interlacing operation to said one of the stream of video fields; and
   an UNLOCK instruction that causes the de-interlacing unit not to perform a de-interlacing operation to said one of the stream of video fields.

9. The method of claim 8, wherein the step of generating a set of instructions further comprises:
   defining a set of data regions, comprising correlated, contradicting, and indeterminate data regions for a specific cadence; and
   generating the set of instructions by comparing the set of parameters derived from said one of the stream of video fields with the defined data regions.

10. The method of claim 9, wherein the step of delivering the set of instructions further comprises:
    generating the LOCK instruction if said video field falls in the correlated data region; and
    generating the UNLOCK instruction if said video field falls in the contradicting data region.

11. The method of claim 10, wherein the step of delivering the set of instructions further comprises generating the UNLOCK instruction if said video field falls in the indeterminate data region.

12. The method of claim 10, wherein the step of delivering the set of instructions further comprises generating the UNLOCK instruction if said video field is a video-based source.

13. The method of claim 10, wherein the step of generating the LOCK instruction further comprises:
    setting a state to UNLOCKED and a film-mode-lock parameter as FALSE;
    upon receiving a field, characterizing a field data of the received field data for a cadence sync index;
    if it is determined that the data of the received field falls in the correlated region, resetting the state as sync detected; and waiting for a next field;
    upon receiving the next field, characterizing the next field for a current cadence index;
    if it is determined that the a data of said next video field falls in the correlated region, advancing the cadence; and increasing a consecutive cadence by 1; and
    setting the state as LOCKED and the film-mode-lock parameter as TRUE so as to cause the de-interlacing unit to perform the de-interlacing.

14. A device for use in a progressive video system that comprises a de-interlacing unit designated for de-interlacing a stream of interlaced signals for processing the stream of incoming video fields, the device comprising a de-interlacing control unit that comprises:
    a characterization unit capable of generating a set of parameters and defining a set of field regions based on the incoming fields;
    a synchronization and lock state machine connected to the de-interlacing unit and the characterization unit for generating a set of instructions for instructing an operation of the de-interlacing unit based on the field regions and the incoming fields; and
    a cadence state machine connected to the synchronization and lock state machine for generating a field jam direction for the de-interlacing unit based on an instruction from the synchronization and lock state machine.

15. The device of claim 14, wherein the characterization unit is capable of calculating a set of parameters from the video stream; and wherein the set of parameters comprises a field difference, a field correlation, and a delta field difference.

16. The device of claim 15, wherein the synchronization and lock state machine is capable of making the determination based on the field difference, the field correlation, and the delta field difference.

17. The device of claim 14, wherein the de-interlacing control unit is implemented in an electronic circuit.

18. The device of claim 17, wherein the electronic circuit is a field programmable gate array or an application specific integrated circuit.

19. The device of claim 17, wherein the characterization unit is capable of calculating a set of parameters from the video stream; and wherein the set of parameters comprises a field difference, a field correlation, a delta field correlation.

20. The device of claim 19, wherein the synchronization and lock state machine is capable of making the determination based on the field difference, the field correlation, and the delta field correlation.

21. A method for use in a progressive video system having a de-interlacing unit designated for de-interlacing a stream video fields, the method comprising:
    detecting a plurality of breaks in the video fields;
    determining whether the plurality of breaks complies with a pre-determined pattern; and
    preventing the de-interlacing unit from performing a de-interlacing operation when the pattern satisfies a pre-determined criterion.

22. The method of claim 21, wherein the step of preventing the de-interlacing unit from performing a de-interlacing operation further comprises preventing the de-interlacing unit from performing a de-interlacing operation when it is detected that a larger number of breaks than a number of complete cadence for a given period has occurred.

23. The method of claim 22, further comprising:

initiating a consecutive cadence counter to an initial value;

decreasing the consecutive cadence counter by 1 at each time when a break is detected;

upon receiving a plurality of fields with field data falling in a correlated data region, increasing the consecutive cadence counter by 1;

determining whether the consecutive cadence counter is greater than a threshold; and instructing the de-interlacing unit to perform a de-interlacing when the consecutive cadence counter is greater than the threshold.

* * * * *